Sept. 6, 1966 D. W. BAHR 3,270,506
LIQUID-VAPOR FUEL INJECTOR FLAMEHOLDER
Filed Oct. 31, 1961
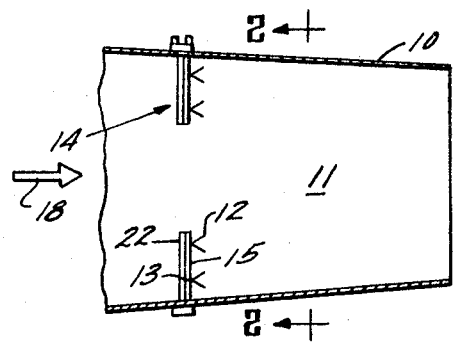
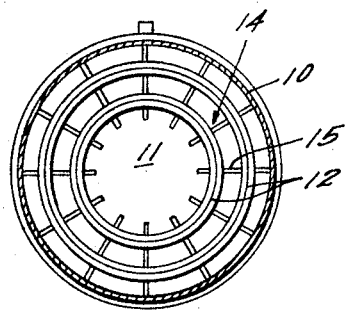
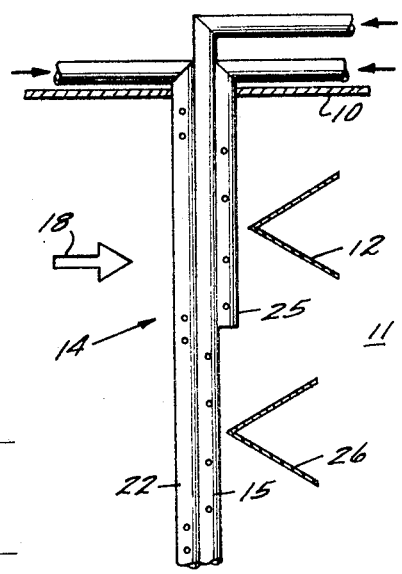
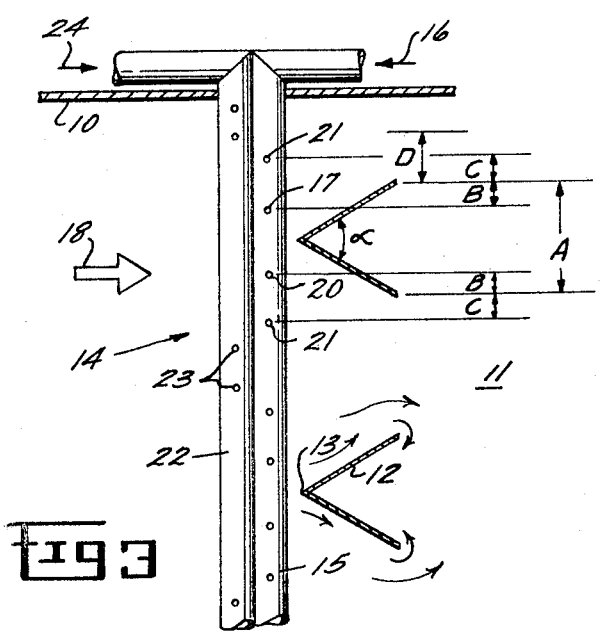
INVENTOR.
DONALD W. BAHR
BY
John F. Cullen
ATTORNEY ns Patent Office
3,270,506
Patented Sept. 6, 1966

3,270,506
LIQUID-VAPOR FUEL INJECTOR FLAMEHOLDER
Donald W. Bahr, Cincinnati, Ohio, assignor to General
Electric Company, a corporation of New York
Filed Oct. 31, 1961, Ser. No. 149,023
15 Claims. (Cl. 60—39.72)

The present invention relates to a liquid-vapor fuel injector-flameholder and, more particularly, to a wide range unitary injector-flameholder of this type for use in a reaction engine combustion chamber where the inlet air temperature is widely variable.

At high flight speeds, the problems associated with cooling air breathing jet engines and other aircraft parts becomes very severe. At these conditions, obtaining adequate cooling of the combustion chamber walls of these engines is an especially severe problem. The aircraft fuel is the logical reservoir available to provide this critically needed cooling capacity because the air temperature at such high flight speeds is too hot for satisfactory cooling. The use of fuel cooling in place of air cooling has become more conventional since improved engine performance and the elimination of the need for special materials of construction may result when fuel cooling is employed.

Therefore, in some cases it has been found to be very advantageous to cool the burner walls of various augmentation systems and ramjet engines in addition to other engine and aircraft parts with fuel. These systems include conventional turbojet afterburners as well as combination turbojet-ramjet systems.

If extensive cooling of aircraft and engine parts is accomplished with the fuel the fuel will be supplied to the combustion chamber wholly as vapor at some operating conditions. At other operating conditons, however, complete vaporization of the fuel may not be obtainable without introducing excessive complexity into the heat exchanging equipment. In many applications, partial fuel vaporization may be expected at flight conditions where the fuel flow rates are high and/or the flight Mach numbers are low. Thus, suitable combustion chamber injectors are required for applications in which the fuel is used extensively for cooling. These injectors must employ vaporized fuel in an effective manner for efficient combustion and must also effectively utilize, in some cases, a liquid fuel in conjunction with the vaporized fuel. This latter requirement is important since the introduction of heat exchanger equipment to vaporize the fuel completely at all operating conditions adds considerable complexity to the engine.

In addition, combustion chambers for applications of this kind must often operate over wide ranges of burner inlet conditions, particularly inlet temperatures, as well as over wide ranges of fuel air ratios. For operation at the high inlet temperatures which are encountered generally in afterburner combustion chambers and at high flight speed conditions in ramjet engines, a close coupled fuel injector-flameholder arrangment must be employed to prevent the flameholder burn-out which is very likely to occur if fuel is injected even a few inches upstream of the flameholder. To avoid considerable complexity in the fuel injector and fuel control systems, it is very important that the close coupled fuel injector-flameholder arrangement also be operable at flight conditions where the inlet temperatures are low. Such temperatures are usually found in ramjet, turbo-ramjet, and similar applications during some portions of the flight mission.

Operation at conditions where the burner inlet temperatures are low generally occurs at intermediate flight speeds in ramjet and turbo-ramjet engines. Operation at conditions where the burner inlet temperatures are high is usually encountered in afterburner combustion systems of turbojet engines and turbo-ramjet engines and in ramjet engines at high flight speeds. Using conventional technology, fuel injection at a considerable distance upstream of the flameholders would normally be employed in the low inlet temperautre conditions of these engines. However, with the high inlet temperature conditions which occur during other portions of the flight, upstream fuel injection often results in self ignition and burning of the fuel before it reaches the flameholders generally resulting in destruction of the flameholder structure downstream. Liquid fuel injection systems have been used and are presently used to ful fill these operating requirements. However, to meet these mutually exclusive requirements of operation with both low inlet temperature and high inlet temperature to the burner, dual fuel injection systems are normally provided to operate at appropriate times. Obviously, the use of dual systems adds complexity in structure, weight and controls. Duel fuel systems can be eliminated through the use of vaporized fuels, providing vaporized fuel is available at all operating conditions.

At low burner inlet temperature operating conditions, effective utilization of vaporized fuel is, therefore, especially important. In addition, provisions for efficiently burning relatively large amounts of liquid fuel must also be included, since sufficient heat to vaporize a high percentage of the total fuel flow is generally unavailable at these flight conditons. For satisfactory performance at high inlet temperature operating conditons, effective use of both vaporized fuel and liquid fuel is also necessary. At these latter operating conditions, sufficient heat is generally available to vaporize a high percentage of the fuel. Thus, a fuel injector-flameholder arrangement is required that will operate over a wide range of conditions using vapor and liquid fuel in varying quantities and the fuel injector-flameholder device must operate efficiently at all flight conditions.

A system to operate under these conditions wherein some of the fuel is vaporized at all operating conditions and the vapor and liquid fuel streams are separately supplied to the combustion system is disclosed and claimed in applicant's co-pending application Serial No. 148,935 filed October 31, 1961 and assigned to the assignee of the instant application. That disclosure is directed to a system for wide range operation and the instant disclosure is directed to a fuel injector-flameholder arrangement which is usable with that system but is also usable with other systems wherein liquid and vapor fuel may be supplied to the injector.

The main object of the present invention is to disclose a wide range liquid-vapor fuel injector-flameholder for efficient operation over a wide range of burner inlet temperature conditions and different fuel air ratios.

A further object is to provide such as injector-flameholder which will satisfactorily handle wide ranges of combinations of vapor-liquid percentages and inject these to provide high combustion efficiency levels.

Another object is to provide such an injector-flameholder which uses separate vapor and liquid spray bars to provide a pilot flame through vapor injection and a fill-in flame through liquid injection.

Briefly stated, the liquid-vapor fuel injector-flameholder of the instant invention comprises conventional V-gutters with substantially separate radial directed vapor and liquid spray bars perpendicular thereto and extending into the combustion chamber. As many of these as required may be used depending upon the particular engine design. The injector-flameholder of the instant invention is specific in size and location of the spray orifices with respect to one another and the gutter as well as the size and blockage permissible in any given combustion chamber. These dimensions are critical having, by actual operation, resulted in the efficient wide range operation attributed to this invention.

While the specification concludes with claims particularly pointing out and distinctly claiming the subject matter which I regard as my invention, it is believed the invention will be better understood from the following description taken in connection with the accompanying drawing in which:

FIGURE 1 is a partial schematic view of a typical combustion chamber such as an afterburner showing the location of the fuel injector-flameholder therein;

FIGURE 2 is a view on line 2—2 of FIGURE 1 illustrating the peripheral arrangement of the spray bars;

FIGURE 3 is a partial view of an individual injector-flameholder showing the critical dimensions required; and, FIGURE 4 is a modification of another form of injector-flameholder particularly useful when operation at very low fuel/air ratios, as well as at high fuel air ratios, is required.

Referring first to FIGURE 1, there is shown a typical application of the injector-flameholder of the instant invention. It will be appreciated, as described above, that the injector-flameholder is usable at both low and high inlet air temperatures and FIGURE 1 may illustrate an application at both of these conditions. Casing 10 may be thought of as the combustion chamber of a turbojet engine afterburner with a high inlet air temperature; as the combustion chamber of a ramjet engine with either a high or a low inlet air temperature; or as the augmentor combustion chamber of combination engines, such as turbo-ramjet engines, in which both high and low inlet temperatures are encountered during different portions of the flight misison. In order to provide sufficient fuel throughout the combustion chamber 11, a plurality of V-gutters 12 or their equivalent are circumferentially disposed transversely across the combustion chamber with their apexes directed upstream in the conventional manner. It will be appreciated that these V-gutters are generally arranged across the combustion chamber and may or may not be in a common plane as is shown in FIGURE 1, i.e., they may be offset with respect to one another. The V-gutters provide a stagnant region in the high velocity exhaust stream in which flame may be stabilized for the purpose of igniting the subsequently introduced fuel. In order to supply such fuel, a plurality of spray bars generally indicated at 14 is arranged about the periphery of the V-gutters to extend into the combustion chamber 11 and is also arranged, with respect to the V-gutters, substantially radially and perpendicularly to the projected plane across the chamber of the V-gutters as shown in FIGURE 2. Thus far described, this structure is conventional and merely illustrates the setting and general arrangement of the individual injector-flameholder to be more specifically described.

As previously stated, it is assumed that some vapor fuel is available at all flight conditions for the operation of the present injector-flame holder. A system to supply this vapor fuel with liquid fuel is disclosed and claimed in said co-pending application. A specific injector-flameholder is shown in FIGURE 3. It should be noted that while the term "V-gutters" is used herein, it is intended to encompass the equivalent such as U-gutters or the like. The generic term "V-gutters" is employed as an understood term in the art as applied to flameholders. Each individual injector-flameholder includes a first fuel injection tube or vapor spray bar 15 that extends into the combustion zone or chamber 11 closely adjacent the apex of the V-gutter as shown. The term "closely adjacent" is intended to imply a substantially integral structure. Obviously, it is not essential that the V-gutters and spray bars be integral with one another but merely that they form a unitary structure in the normal sense of the word. Thus, in FIGURE 3, spray bar 15 and V-gutters 12 may be spaced slightly apart say, up to a half inch or so, or may be integral with one another. This is the meaning intended by the term "closely adjacent" as opposed to a relatively large space such as occurs in upstream injection where the spray bar is physically spaced a considerable distance upstream from the V-gutters. The actual size of spray bar 15 will be that determined by design considerations of the particular engine but normally would range between a quarter and three quarters of an inch in diameter. The major consideration is to avoid undue drops in the fuel pressure as the fuel flows through the spray bar. Spray bar 15 is intended to convey vapor into the chamber 11 from the entrance at 16 which vapor may be obtained from a suitable source after cooling of an engine part such as disclosed in said co-pending application. The length of spray bar 15 is merely that required to deliver the fuel along the combustion chamber radius. In actual practice, the specific spray bar construction and disposition of parts in bar 15 which have been found to give wide range efficient combustion will now be described. For the vapor fuel to issue, a first set of oppositely directed orifices 17, which are substantially diametrically opposed to one another on each side of the spray bar, are provided in the spray bar in a critical location. These orifices inject or spray local or primary vapor fuel substantially transverse to the air flow, as shown by arrow 18, and across the combustion chamber. It is essential that these orifices be disposed at least one quarter inch inside the V-gutter trailing edge which is shown as dimension B on FIGURE 3. Such injection permits the vapor fuel to effectively go over the trailing edge of the V-gutter and get into the recirculation region behind the V-gutter as shown by the arrows in the bottom V-gutter in FIGURE 3. That this dimension is critical has been shown by tests wherein less than a quarter inch has severely limited the range of operation and the performance of the injector-flameholder. The location of orifices 17 such that dimension B is less than one quarter inch results in poor combustion because of the inability of the vapor to effectively go over the trailing edge of the V-gutter and get back into the recirculation region behind the V-gutter. Thus, the limitation specified is critical for the wide range operation claimed herein. Since the actual size of the V-gutter, illustrated by dimension A in FIGURE 3 may vary between three quarters and three inches, depending upon its environment, it can be seen orifice 17 may fall directly behind the apex 13 of the V-gutter. However, unless this can be precisely arranged so that the vapor fuel is evenly split to flow on both sides of the V-gutter, it is preferable to provide a second set of symmetrically arranged orifices 20 on the other side of the V-gutter apex with the same quarter inch limitation from the V-gutter trailing edges.

From a combustion standpoint, there is a limit as to how much of the total fuel supply can be passed through orifices 17 and 20 and if a high percentage of the fuel is vaporized and all of it is passed through these orifices, it is possible for the region around the V-gutter to become locally too fuel rich, thus precluding efficient combustion since much of the fuel is not burned under these conditions until it is considerably downstream of the V-gutters. To avoid this, it has been found advantageous to provide a second set of similar orifices 21 to inject part of the vaporized fuel as fill fuel outside of the trailing edges of the V-gutter. These latter orifices are like, and oriented the same as, first orifices 17 and 20 and these fill orifices are critically located at least one quarter inch outside the V-gutter trailing edge as shown in dimension C in FIGURE 3. This second set of orifices in conjunction with the first set of orifices provides good fuel and air mixing and rapid burning and results in a quick establishment of a large pilot flame. Normally, equal diameters are used for both the local and fill vapor fuel orifices and, therefore, the vapor fuel flow is divided into approximately equal portions with half of the fuel injected as primary fuel and the other half as fill fuel. This vapor flow split easily permits efficient operation from lean overall fuel air ratios to stoichiometric overall fuel air ratios. If high fuel air ratio operation is not required in a specific engine application and operation at lean overall fuel air ratios is emphasized, the ratio of vapor local fuel to vapor fill fuel can be increased accordingly by decreasing the size of the fill vapor fuel orifices 21 relative to that of the local fuel orifices 17. At a given total fuel air ratio, this vapor fuel local-fill arrangement permits efficient combustion operation with widely varying percentages of the total fuel as vapor fuel. With an equal division of the vapor fuel between the local and fill orifices and total fuel air ratios in excess of 0.04, for example, efficient combustion is possible whether all of the fuel supply is injected as vapor or if only 20 percent of the total fuel supply is injected as vapor and the remainder of it is injected as liquid using the techniques to be described in subsequent portions of the instant application. Thus, this arrangement introduces flexibility in that the operation of the injector-flameholder is not overly sensitive to the design of the heat exchangers in which the fuel is used as the medium to cool engine structures. The injector-flameholder is able to handle a wide range of vaporized portions of the total fuel and is not dependent upon the ability of the heat exchangers to vaporize all of the fuel. This vapor injection thus described, and the liquid fuel injection to be described, operates most efficiently when the included angle α between the V-gutter legs is between 30 degrees and 120 degrees. With this limitation, the wide range and efficient combustion is available whereas beyond this range it is not possible. The preceding description relates to the vapor fuel injection.

Since the fuel supply is not always wholly vaporized but may be a combination of vapor and liquid, it is necessary to provide for liquid fuel injection as well. To this end, liquid spray bars 22, similar to the vapor spray bars 15 extend into the chamber closely adjacent to and backing the vapor spray bars 15. Spray bars 22 may be on either side of spray bars 15 and the term "backing" is intended to cover either arrangement. Preferably they would be placed upstream thereof as shown. Again, the term "closely adjacent" implies the generally unitary structure, and in practice, the two spray bars are actually brazed together. However, it is possible that the spray bars might be slightly separated, if desired. In this case, they are still considered to be "adjacent" in this sense as opposed to the relatively long axial distances as used in conventional upstream fuel injection practice. Since a good vapor fuel pilot flame is now disposed on the flameholders by virtue of the vapor system previously described, it is desirable to fill in the space between the orifices 21 of adjacent V-gutters. This is done with liquid fill fuel injection through orifices 23 which, again, are oppositely disposed, like vapor orifices 20, to spray across the combustion chamber. These orifices are critically located so that the closest liquid orifice is disposed at least one quarter inch outside of the V-gutter trailing edge as shown by dimension D in FIGURE 3. Obviously, this may put it directly behind orifice 21 but it cannot be inside of orifice 21 and preferably will be spaced from orifice 21 symmetrically as shown. The actual spacing of orifices 23, which may assume any number, is usually made by dividing the distance between the outer orifices 21 and supplying an orifice 23 for each division part. For example, if the space between adjacent orifices 21 of the adjacent V-gutters is divided into two parts, an orifice 23 will be provided in the middle of each part as shown in FIGURE 3. Thus, regardless of how the total fuel supply is divided between vapor which enters at 16 and liquid which enters at 24 respectively, the injector-flameholder just described provides wide range operation and very efficient combustion. This efficient operation is possible even when some of the fuel is injected as liquid because of the strong pilot flame on the V-gutters from the vapor injector 15 which rapidly spreads across the area between the gutters to ignite the liquid fill fuel from liquid spray bars 22.

It is important that the orifices themselves be sized properly that they are not too small or too large. Too large orifices result in poor initial fuel distribution patterns because of the low fuel injection pressure drops and, as a result, inefficient combustion. Too small orifices often result in clogging of the orifices due to coke and gum which is usually found in hot hydrocarbon fuel. Thus, it has been found that the orifice diameter should be between .03 and .12 inch in order to be effective. Furthermore, for the efficient wide range combustion with this unitary injector-flameholder, as many will be used as necessary across the combustion chamber so that the projected area of the injector-flameholder occupies between 15 to 60 percent of the cross sectional area of the combustion chamber. Below this, incomplete combustion is obtained and above this excessive pressure losses due to the high air stream blockage are obtained. The transverse injection described, while it may vary slightly from absolute transverse to the air flow, is substantially transverse to the air flow in order to avoid local enrichment and poor combustion.

Referring next to FIGURE 4, a modification is shown wherein the same dimensional limitations previously described are essential, thus are not repeated, but which modification uses a division of the vapor fuel supply and directs it into a first vapor spray bar 25 and a second spray bar 15 backing and closely adjacent the first spray bar upstream of it. The second bar 15 extends farther into the combustion chamber to a second inner V-gutter 26. Again, the same dimensional limitations of the orifices, the included angle of the V-gutter and the overall blockage still applies. Such a modification might be used if a very small temperature rise is desired, thus necessitating operation at a very low overall fuel air ratio. It does introduce the complexity of more control because of the two vapor supplies. For extremely lean burning, this modification permits the use of the inner or second V-gutter 26 while the outer V-gutter 12 is shut down. Thus, it is possible to supply only one leg 15 of the vapor injector to obtain core burning in the middle of the combustion chamber for a locally proper fuel air ratio but an overall lean fuel air ratio. This might be used where it is desired to reduce the heat input to the external heat exchanger in engine applications where the heat loads vary over an extremely wide range. Thus, this decreases the heat input to the heat exchanger and still provides the wide range operation at high and low temperatures as well as over widely varying ranges of fuel air ratios, for more flexibility.

The injector-flameholder described provides efficient burning over these wide ranges of operating conditions and handles widely varying divisions of the total fuel supply as vapor and liquid without sacrificing this efficient burning thereby simplifying the design of the heat exchange equipment because of this insensitivity to vapor-liquid fuel division.

While I have hereinbefore described preferred forms of my invention, obviously modifications and variations of the present invention are possible in the light of the above teachings. It is therefore to be understood that within the scope of the appended claims, the invention may be practiced otherwise than as specifically described.

I claim:

1. A wide range liquid-vapor fuel injector-flameholder for a reaction engine combustion chamber comprising, a V-gutter circumferentially disposed in said combustion chamber with its apex upstream, a first vapor spray bar extending substantially radially into the combustion zone closely adjacent the apex of the V-gutter and substantially perpendicular thereto, a first set of oppositely directed orifices in the spray bar oriented to spray vapor fuel substantially transverse to the air flow through the chamber, said orifices disposed at least one quarter inch inside the V-gutter trailing edge, said orifices providing a vapor pilot flame on the V-gutter, a second liquid spray bar backing and closely adjacent said first spray bar, a set of oppositely directed orifices oriented to spray liquid fuel substantially transverse to the air flow, said orifices for liquid being disposed at least one quarter inch outside of the V-gutter trailing edges to provide liquid fill flame adjacent said vapor pilot flame.

2. Apparatus as described in claim 1 wherein the sets of vapor and liquid orifices in the vapor and liquid spray bars respectively are provided on each side of the V-gutter apex.

3. Apparatus as described in claim 1 wherein the orifice diameter is between .03 and .12 inch.

4. Apparatus as described in claim 1 wherein the included angle between the V-gutter legs is between 30 and 120 degrees.

5. Apparatus as described in claim 4 wherein the projected area of the injector-flameholder occupies between 15 to 60 percent of the cross sectional area of the combustion chamber.

6. A wide range vapor-liquid fuel injector-flameholder for a reaction engine combustion chamber comprising, a plurality of V-gutters circumferentially disposed transversely across said combustion chamber with their apexes upstream, a plurality of vapor spray bars about the periphery of the V-gutters extending into said chamber substantially radially and perpendicularly to the apices of the V-gutters, each vapor spray bar being disposed closely adjacent the apex of each V-gutter, a first set of oppositely directed orifices in each spray bar at each V-gutter oriented to spray vapor substantially transverse to the air flow through the combustion chamber, said orifices disposed at least one quarter inch inside the V-gutter trailing edge, a second set of like orifices disposed at least one quarter inch outside of the V-gutter trailing edge, said orifices providing a vapor pilot flame on the V-gutter, a plurality of liquid spray bars extending into said chamber, one adjacent and backing upstream with each vapor spray bar, a set of oppositely directed orifices in each liquid spray bar disposed between the second sets of vapor orifices for each V-gutter and oriented to spray liquid substantially transverse to the air flow, said liquid orifices being disposed at least one quarter inch outside of the V-gutter trailing edges to provide liquid fill flame between said vapor pilot flame at each V-gutter.

7. Apparatus as described in claim 6 wherein the sets of vapor and liquid orifices in the vapor and liquid spray bars respectively are provided symmetrically on each side of each V-gutter apex.

8. Apparatus as described in claim 7 wherein the orifice diameter is between .03 and .12 inch.

9. Apparatus as described in claim 7 wherein the included angle between the legs of each V-gutter is between 30 and 120 degrees.

10. Apparatus as described in claim 7 wherein the projected area of the injector-flameholder occupies between 15 to 60 percent of the cross sectional area of the combustion chamber.

11. A wide range vapor liquid fuel injector-flameholder for a reaction engine combustion chamber comprising, a V-gutter circumferentially disposed in said combustion chamber with its apex upstream, a first vapor spray bar extending radially into the combustion zone closely adjacent the apex of the V-gutter and substantially perpendicular thereto, a first set of oppositely directed orifices in the spray bar oriented to spray vapor substantially transverse to the air flow through the combustion chamber, said orifices disposed at least one quarter inch inside the V-gutter trailing edge, a second set of like orifices disposed at least one quarter inch outside of the V-gutter trailing edge, said orifices providing a vapor pilot flame on the V-gutter, a second vapor spray bar backing and closely adjacent the first and upstream thereof, said second spray bar extending into said combustion chamber beyond said first to a second inner V-gutter, sets of orifices in said second spray bar oriented and disposed with respect to said inner V-gutter in the same manner as said first spray bar orifices, a liquid spray bar backing and adjacent said second spray bar and upstream thereof, a set of oppositely directed orifices oriented to spray liquid fuel substantially transverse to the air flow, said orifices for liquid being disposed at least one quarter inch outside of the trailing edge of the downstream V-gutter to provide liquid fill flame adjacent the vapor pilot flames from said vapor spray bars.

12. Apparatus as described in claim 11 wherein the sets of vapor and liquid orifices in the vapor and liquid spray bars respectively are provided symmetrically on each side of the V-gutter apex.

13. Apparatus as described in claim 11 wherein the orifice diameter is between .03 and .12 inch.

14. Apparatus as described in claim 11 wherein the included angle between the V-gutter legs is between 30 and 120 degrees.

15. Apparatus as described in claim 11 wherein the projected area of the injector-flameholder occupies between 15 to 60 percent of the cross sectional area of the combustion chamber.

References Cited by the Examiner

UNITED STATES PATENTS

| | | | |
|---|---|---|---|
| 2,720,078 | 10/1955 | Day et al. | 60—39.74 X |
| 2,862,359 | 12/1958 | Spears | 60—39.72 |
| 2,920,449 | 1/1960 | Johnson et al. | 60—39.74 |
| 3,002,353 | 10/1961 | McEneny | 60—39.74 |
| 3,024,606 | 3/1962 | Adams et al. | 60—39.74 X |

MARK NEWMAN, *Primary Examiner.*

SAMUEL FEINBERG, *Examiner.*

G. L. PETERSON, *Assistant Examiner.*